United States Patent
Faller

(10) Patent No.: US 6,651,548 B1
(45) Date of Patent: Nov. 25, 2003

(54) PNEUMATIC BRAKE BOOSTER

(75) Inventor: Jürgen Faller, Kahl (DE)

(73) Assignee: Continental Teves AG & Co OHG, Frankfurt (DE)

( * ) Notice: Subject to any disclaimer, the term of this patent is extended or adjusted under 35 U.S.C. 154(b) by 0 days.

(21) Appl. No.: 09/958,329

(22) PCT Filed: Apr. 4, 2000

(86) PCT No.: PCT/EP00/02991
§ 371 (c)(1),
(2), (4) Date: Dec. 21, 2001

(87) PCT Pub. No.: WO00/61416
PCT Pub. Date: Oct. 19, 2000

(30) Foreign Application Priority Data

Apr. 9, 1999 (DE) .......................... 199 15 941

(51) Int. Cl.⁷ .............................. B60T 13/56
(52) U.S. Cl. ............... 92/169.2; 92/169.3; 91/369.1
(58) Field of Search ................ 92/169.2, 169.3, 92/169.4; 91/369.1, 369.2, 369.3, 369.4

(56) References Cited

U.S. PATENT DOCUMENTS 4,291,534 A * 9/1981 Jones ........................ 92/169.3
4,416,191 A * 11/1983 Takeuchi et al. ......... 92/165 PR
5,487,327 A * 1/1996 Schluter et al. .......... 92/165 PR

FOREIGN PATENT DOCUMENTS

| DE | 32 04 549 | 9/1982 | | |
|---|---|---|---|---|
| DE | 42 04 419 | 8/1993 | | |
| DE | 195 23 021 | 1/1997 | | |
| EP | 0 009 393 | 4/1980 | | |
| GB | 2 093 136 | 8/1982 | | |
| GB | 2093136 A | * | 8/1982 | ........... B60T/13/56 |

OTHER PUBLICATIONS

Search Report of the German Patent Office for Appln 19915941.6.

* cited by examiner

Primary Examiner—Edward K. Look
Assistant Examiner—Igor Kershteyn
(74) Attorney, Agent, or Firm—Rader, Fishman & Grauer PLLC

(57) ABSTRACT

The present invention relates to a pneumatic brake force booster with means for fastening the said to a vehicle wall which extend through the interior of the brake force booster, wherein a fixed stop for a first housing part is provided on a first end and a stop that is adjustable by means of a rotation for a second housing part is provided on a second end, and with means for the pneumatic sealing of housing openings for the fastening means. The gist of the present invention resides in that the fastening means has a smooth sealing portion adjacent to the adjustment area of the adjustable stop, and in that the sealing means, by multilateral abutment on a conical abutment surface of the adjustable stop, on the smooth sealing portion and the associated housing portion, closes a slot between the fastening means and the adjustable stop and a slot between the stop and the housing part. This achieves a simple and low-cost sealing of housing openings for the fastening means.

8 Claims, 2 Drawing Sheets

PNEUMATIC BRAKE BOOSTER

TECHNICAL FIELD

The present invention generally relates to vehicle brake systems, and more particularly relates to a pneumatic brake force booster with means for fastening the booster to a vehicle wall.

BACKGROUND OF THE INVENTION

DE 32 04 549 A1 discloses a brake force booster of this general type. In this booster, a cylindrically deflected housing area which includes a stop in the area of a housing opening for the fastening means that is adjustable in an axially inward direction. Further, the stop which is configured as a nut extends with an annular projection which points axially outwards over the mentioned cylindrical area in such a fashion that an annular interspace for a sealing ring is formed. The sealing ring seals a slot between the nut and the housing due to radial compression. The sealing ring does not serve for sealing the thread between the fastening means and the nut. A sealing compound which is liquid in its original condition is used for this purpose and is applied to the thread or, after the assembly of the brake force booster, to the nut, and then hardens. The sealing compound simultaneously prevents 'an inadvertent rotation of the adjustable stop'.) The sealing of the housing openings as well as the anti-rotation mechanism of the adjustable stop is capable of improvement. On the one hand, there is the requirement of providing a self-boosting sealing arrangement wherein an increased difference in pressure between the interior of the brake force booster and the environment achieves an enhanced sealing effect. It is not precluded in the brake force booster of the prior art that fatigue of the sealing ring will reduce the sealing effect.

Also, the assembly of the sealing ring is desired to be carried out as simply a possible and in a reproducible manner. In the arrangement according to the above-mentioned state of the art, there is the possibility of damaging the sealing ring due to sharp edges when the nut is unscrewed. Admittedly, for eliminating this problem, it is known in the art to arrange the sealing ring on a frontal end (on the housing side) of the nut. However, this measure does not reduce the total effort involved in sealing and, especially, the effort involved in applying the sealing compound.

An object of the present invention is to overcome the disadvantages described hereinabove and, in particular, to achieve a simple solution for sealing. Another object of the present invention includes providing a different anti-rotation mechanism for the adjustable stop.

It has been found that this object is achieved with the present invention in that the fastening means has a smooth sealing portion adjacent to the adjustment area of the adjustable stop, and in that the sealing means, by multilateral abutment on a conical abutment surface of the adjustable stop, on the smooth sealing portion and the associated housing portion, closes a slot between the fastening means and the adjustable stop and a slot between the fastening means and the housing part.

According to the present invention, there is no need for a housing portion that projects cylindrically in the direction of the stop as an abutment for a seal. The conical abutment surface for the sealing means minimizes damages in the assembly and, in addition, along with further characterizing features permits a three-sided abutment, i.e., on the housing part, on the fastening means, and on the stop. This measure permits closing both slots with only one component part so that the effort required for sealing is considerably reduced. It is furthermore favorable that the sealing means is automatically centered during the assembly. Finally, self-boosting of the sealing effect is achieved because at least part of the interspace for the sealing means is permanently subjected to vacuum so that the ambient air pressure which acts from outside presses the corresponding housing area of the housing part permanently in the direction of the sealing means in order to boost the sealing effect.

Further advantages of the present invention can be taken from the subclaims in connection with the description and the accompanying drawings.

DETAILED DESCRIPTION OF THE PREFERRED EMBODIMENTS

Figure 1:
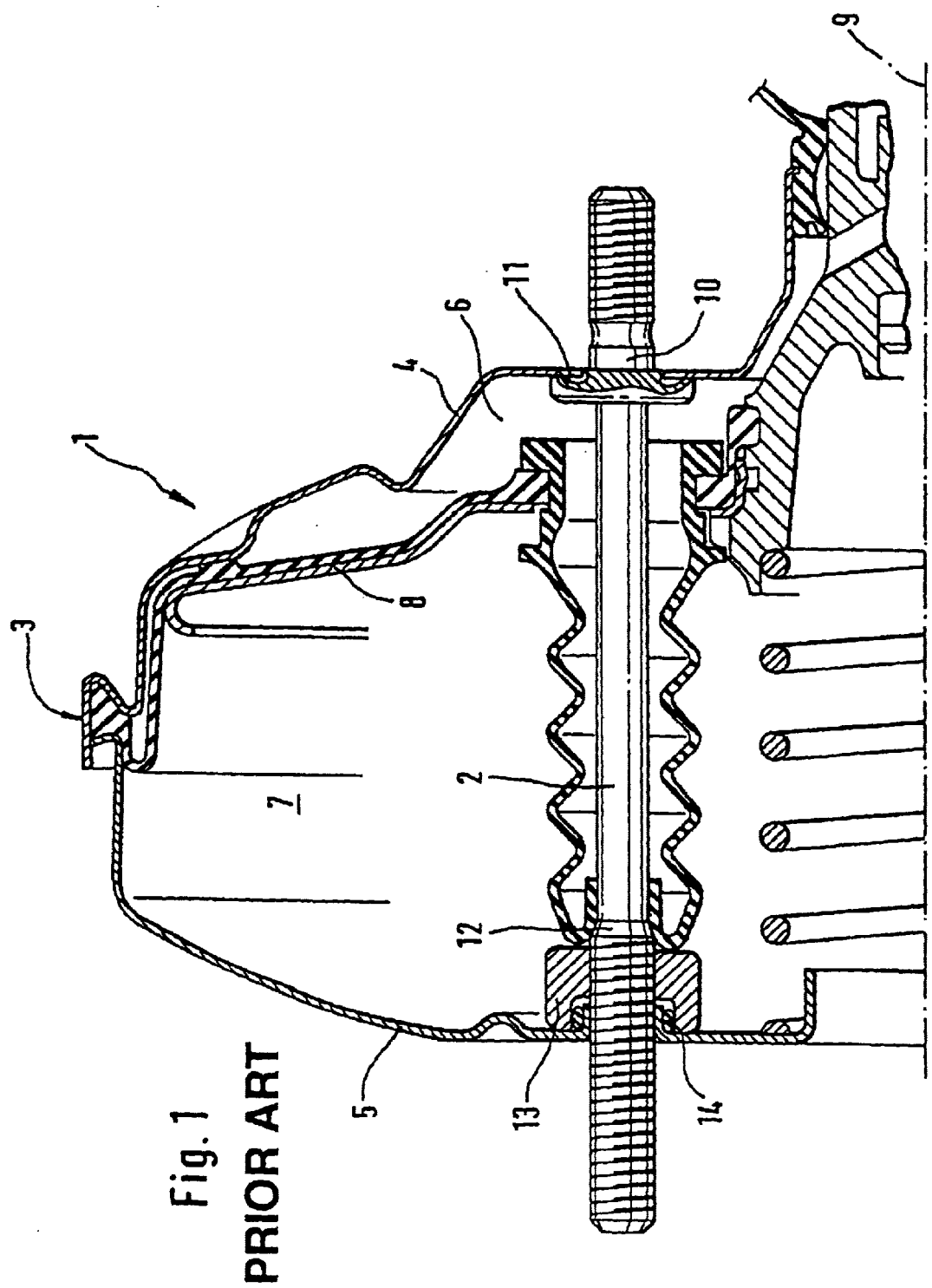
FIG. 1 is a cross-sectional view of a brake force booster according to the state of the art.

Referring to FIG. 1, a pneumatic brake force booster according to the state of the art can be seen which includes a fastening means 2 that extends through the interior of the brake force booster 1, and projects with an end piece out of a left frontal end for attachment of a master brake cylinder (not shown). The assembly made up of brake force booster 1 and the master brake cylinder is intended for attachment on a wall (not shown) of an automotive vehicle by means of an end piece of the fastening means 2 that projects from the right frontal end. The brake force booster 1 includes a housing 3 made up of at least two housing parts 4, 5 attached to one another.

The interior of the housing 3 accommodates, among others, a first pneumatic chamber 6, i.e., a working chamber, and a second pneumatic chamber 7, i.e., a vacuum chamber. The two pneumatic chambers 6, 7 are separated from each other by a movable wall 8. In dependence on the respective actuating condition, a pressure prevails in the first pneumatic chamber 6 which corresponds to the pressure in the second pneumatic chamber 7, the outside atmospheric pressure, or a pressure between these two extreme values. The exact functioning of the brake force booster 1 need not be dealt with in detail in this respect. The interior of the brake force booster 1 (i.e. the two chambers 6, 7) is penetrated by the fastening means 2. Further, the fastening means 2 takes care of a support of the two housing parts 4, 5 in relation to each other in the direction of an axis 9. For this purpose, a fixed stop 11 for abutment of the first housing part 4 is provided on a first, right-hand end 10, and a stop 13 which is adjustable by a rotation and meant for abutment of the second housing part 5 is provided on a second, left-hand end 12. This measure permits adjusting the distance between the two housing parts 4, 5 in a defined manner, even if comparatively thin materials which are deformable under the pressure difference are used for the housing parts 4, 5. In addition, there is provision of sealing means 14 for sealing the housing openings for the fastening means 2.

Figure 2:
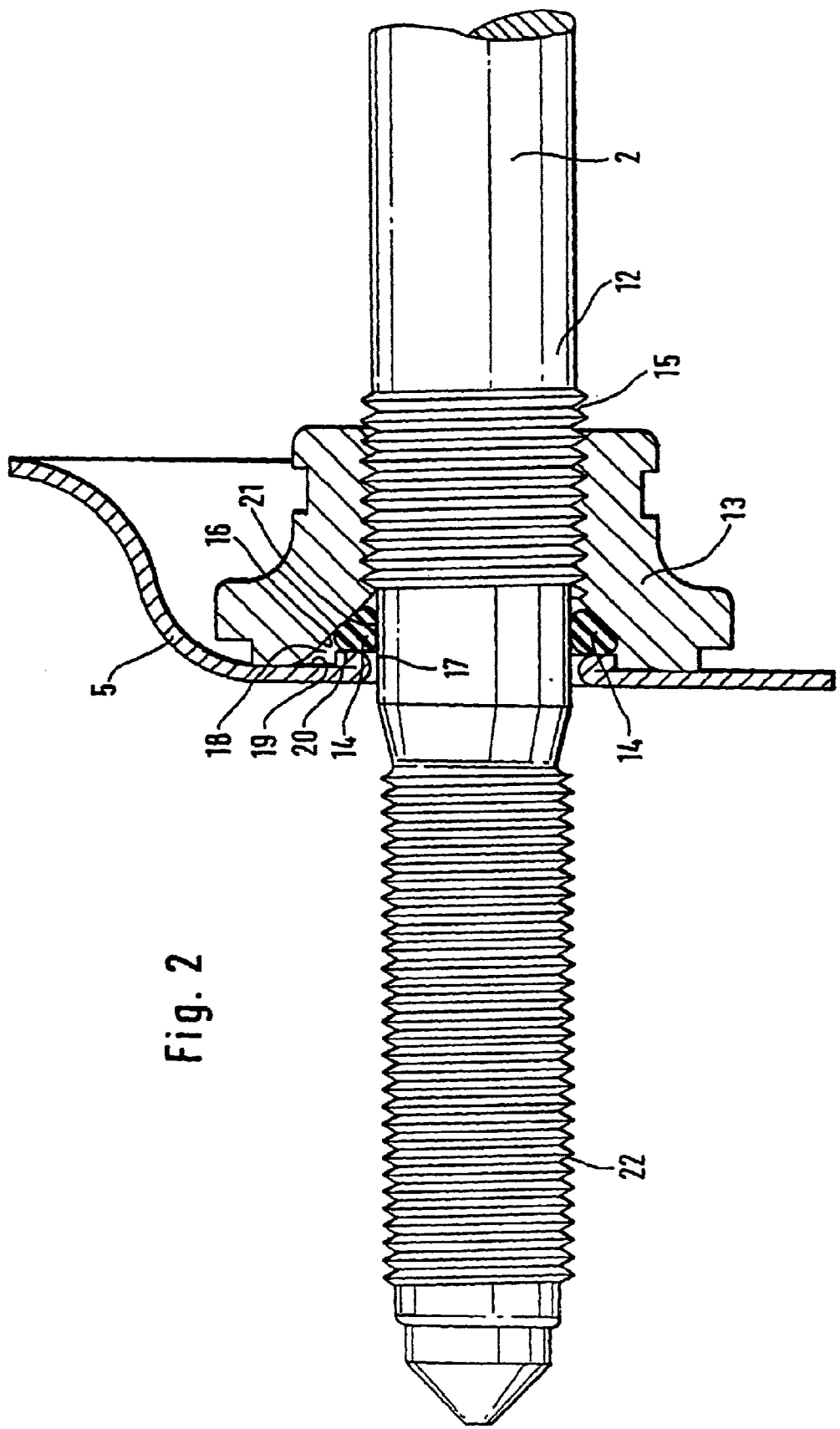
FIG. 2 is a cross-sectional enlarged view of a detail of a brake force booster according to the present invention.

FIG. 2 shows the details on a left-hand end of a fastening means 2 in a brake force booster according to the present invention. Features which correspond to those in FIG. 1 have been designated by identical reference numerals. Stop 13 is designed as a nut which is disposed on a threaded portion 15 of the fastening means 2. For abutment on the housing part 5, stop 13 has a frontal end which passes over into a conical abutment surface 16 for the sealing means 14 in a radially inward direction. The axial length of the mentioned threaded portion 15 defines the length of the adjustment area of the stop 13. Frontally, the adjustment area is followed by a smooth sealing portion 17 which has a smaller diameter than the core diameter of the threaded portion 15. It can be taken from the Figure that the sealing means 14 is disposed in a conical torus-shaped interspace 18 whose walls are formed of the conical abutment surface 16 of the stop 13, the smooth sealing portion 17, and an inner side 19 of the housing part 5. Thus, there occurs a multi-lateral abutment of the sealing means 14, which is three-sided according to the present embodiment, so that a slot 20 between stop 13 and housing part 5 is closed. Further, a slot 21 between stop 13 and fastening means 2 is closed by abutment on the smooth sealing portion 17. Consequently, the sealing means 14 closes two slots 20, 21 which respectively start from the interior of the brake force booster and open into the interspace 18.

Adjacent to the sealing portion 17 is another threaded portion 22 which serves for the attachment of a master brake cylinder on the brake force booster 1 by means of a flange (not shown). The threaded portion 22 along with the first threaded portion 15 for the adjustment area limits the axial length for the sealing portion 17. It must be pointed out that the outside diameter of the second threaded portion 22 is smaller than the core diameter of the threaded portion 15 for the adjustment area.

Another basic aspect of the present invention relates to the prevention of an inadvertent rotation of the adjustable stop 13.

After the defined adjustment of the distance between the two stops 11, 13 has been performed, it is absolutely necessary to prevent any change in the adjustment made during the assembly of the brake force booster, or for the service period of the brake force booster. Otherwise, the brake force booster and master brake cylinder assembly might become loose which would severely adversely affect the reliability in operation. Arrangements are proposed for this prevention function which manage without the need for separate components or working materials, by way of operatively securing the stop 13 in position on the fastening means 2. This can be achieved in different ways, especially by an indirect or direct thread deformation so that some preferred variations will be described hereinbelow. On the one hand, the pitches of the inside thread in the stop 13 and the threaded portion 15 on the fastening means 2 may, to a certain degree, exhibit pitch differences which cause a clamping effect.

According to another embodiment, the core or outside diameters of the two component threads concerned exhibit differences in as far as e.g. the outside diameter of the threaded portion 15 on the fastening means 2 is sized with larger tolerances than the associated core diameter of the thread in the stop 13. This teaching may also be employed in an opposite way with respect to the core diameter of the threaded portion 15 on the fastening means 2 paired with the nominal diameter of the thread in the stop 13. A similar effect can be produced in a particularly simple manner by an indirect thread deformation (without direct effect on the course of thread itself) because the adjustable stop 13 is furnished with caulked portions which are produced from radially outwards on the outside surface or an edge, as is illustrated exemplarily in FIG. 2. Due to this caulked portion, the respective threaded portion of the stop 13 is deformed in a defined and locally restricted manner, and a securing-in-position is achieved in the unscrewed condition. For example, it is also possible to caulk a groove which extends over the periphery and deforms the threaded portion radially inwards. Also, defined radial deformations of the threaded portion 15 of the fastening means 2 or of the blank for the manufacture of the fastening means 2 with the threaded portion 15 are feasible in order to provide a clamping effect along with the stop 13. For example, the fastening means 2 includes a none-circular cross-section of a polygon profile type at least in the area of the threaded portion 15, and the radially projecting partial threaded portions are oversized in the stop 13 with respect to the associated thread (as has already been described hereinabove) so that the desired clamping effect is achieved. Of course, deformations of a frontal end of the stop 13 which aim at a securing-in-position are possible to the same extent without departing from the spirit of the present invention.

Alternatively to the described variations, it is also feasible to indent an axial groove in the threaded portion 15 into which a clamping securing element, e.g. from plastic material, is inserted before the stop 13 is screwed on.

What is claimed is:

1. A pneumatic brake force booster, comprising:
    a housing made from a first and a second housing part, wherein said first and second housing parts form an interior chamber,
    fastening means for fastening said housing to a vehicle wall, wherein said fastening means extends through the interior chamber of the brake force booster, wherein a fixed stop for a first housing part is provided on a first end of said fastening means, and wherein a second stop that is adjustable by rotation, for stopping said second housing part, is provided on a second end of said fastening means, and
    means for the pneumatically sealing the fastening means, wherein the fastening means has a smooth sealing portion adjacent to the adjustment area of the adjustable stop, wherein the sealing means, by way of multilateral abutment on a conical abutment surface of the adjustable second stop, on the smooth sealing portion and the associated first housing portion, closes a first slot between the fastening means and the adjustable second stop and a second slot between the second stop and the second housing part.

2. The pneumatic brake force booster as claimed in claim 1, wherein the interspace between the housing, the adjustable second stop, and the fastening means has the shape of a conical torus, and wherein the first and second slots, starting from the interior of the housing, open into the interspace.

3. The pneumatic brake force booster as claimed in claim 2, wherein the fastening means adjacent to the sealing portion includes a threaded portion, wherein the threaded portion along with the adjustment area of the stop limits the axial length of the sealing portion.

4. The pneumatic brake force booster as claimed in claim 3, wherein an outside diameter of the threaded portion is smaller than a core diameter of a thread for the adjustment area.

5. The pneumatic brake force booster as claimed in claim 2, wherein an interspace with at least a partial portion is connected to the interior chamber so that a second housing part is urged in the direction of the sealing means due to a vacuum between the interspace and the ambient atmosphere for the purpose of reinforcing of the sealing effect.

6. The pneumatic brake force booster as claimed in claim 1, wherein the conical abutment surface, the sealing portion and an inner side of the second first housing part limit a conical torus-shaped interspace.

7. The pneumatic brake force booster as claimed in claim 1, further including an anti-rotation mechanism coupled between the adjustable second stop and the fastening means.

8. The pneumatic brake force booster as claimed in claim 7, wherein direct or indirect thread deformation is provided as a position-securing means.

* * * * *

UNITED STATES PATENT AND TRADEMARK OFFICE
CERTIFICATE OF CORRECTION

PATENT NO.   : 6,651,548 B1
DATED        : November 25, 2003
INVENTOR(S)  : Jurgen Faller It is certified that error appears in the above-identified patent and that said Letters Patent is hereby corrected as shown below:

<u>Column 4,</u>
Line 58, please change "of the second first housing" to -- of the second housing --.

Signed and Sealed this

First Day of June, 2004

JON W. DUDAS
*Acting Director of the United States Patent and Trademark Office*